United States Patent
Hu

(10) Patent No.: US 10,203,432 B2
(45) Date of Patent: Feb. 12, 2019

(54) FRESNEL LENS SYSTEM

(71) Applicant: BOLYMEDIA HOLDINGS CO. LTD., Santa Clara, CA (US)

(72) Inventor: Xiaoping Hu, Shenzhen (CN)

(73) Assignee: BOLYMEDIA HOLDINGS CO. LTD., Santa Clara, CA (US)

( * ) Notice: Subject to any disclaimer, the term of this patent is extended or adjusted under 35 U.S.C. 154(b) by 0 days.

(21) Appl. No.: 15/529,078

(22) PCT Filed: Nov. 25, 2014

(86) PCT No.: PCT/CN2014/092139
§ 371 (c)(1),
(2) Date: May 23, 2017

(87) PCT Pub. No.: WO2016/082097
PCT Pub. Date: Jun. 2, 2016

(65) Prior Publication Data
US 2017/0261652 A1 Sep. 14, 2017

(51) Int. Cl.
*G02B 3/08* (2006.01)
*G02B 27/00* (2006.01)
*G02B 3/00* (2006.01)

(52) U.S. Cl.
CPC .......... *G02B 3/08* (2013.01); *G02B 27/0012* (2013.01); *G02B 2003/0093* (2013.01)

(58) Field of Classification Search
CPC ..................................... G02B 3/08
USPC ............................................. 359/742
See application file for complete search history.

(56) References Cited

U.S. PATENT DOCUMENTS

| | | | |
|---|---|---|---|
| 2005/0024746 A1* | 2/2005 | Shimura | F21V 5/045 359/742 |
| 2010/0061106 A1* | 3/2010 | Shyu | G02B 3/08 362/311.02 |
| 2014/0092471 A1 | 4/2014 | Sadahiro et al. | |

FOREIGN PATENT DOCUMENTS

| | | |
|---|---|---|
| EP | 0305009 A2 | 3/1989 |
| JP | 2012252227 A | 12/2012 |
| WO | 2008153435 A1 | 12/2008 |

OTHER PUBLICATIONS

International Search Report for PCT/CN2014/092139, dated Aug. 20, 2015, and its English translation provided by WIPO.
Written Opinion of the International Search Authority for PCT/CN2014/092139, dated Aug. 20, 2015, and its English translation from Bing.com Microsoft Translator.

* cited by examiner

*Primary Examiner* — James Jones
(74) *Attorney, Agent, or Firm* — Ladas & Parry, LLP

(57) ABSTRACT

A Fresnel lens system, comprising at least two tooth faces located on the same light path; each of the tooth faces comprises at least one Fresnel unit, each Fresnel unit being a Fresnel refraction surface formed by an original curved surface; at least one of the two tooth faces is a complex Fresnel refraction surface or a filled Fresnel refraction surface, or the two tooth faces are at a same physical interface and an element located thereon has a reflective back surface. The Fresnel lens system can adequately utilize the advantage of thinness of Fresnel lens, thus better adjusting the light path without a significant increase in the thickness of the system.

9 Claims, 6 Drawing Sheets

FRESNEL LENS SYSTEM

CROSS REFERENCE TO RELATED APPLICATIONS

The present application is the U.S. national phase of PCT Application PCT/CN2014/092139 filed on Nov. 25, 2014, entitled "FRESNEL LENS SYSTEM", the disclosure of which is hereby incorporated by reference in its entirety.

TECHNICAL FIELD

The present disclosure relates to optical elements, specifically to Fresnel lens systems.

BACKGROUND

Fresnel lens is a thin lens. A Fresnel lens may be obtained by segmenting a continuous curved surface of an ordinary lens into a plurality of segments and arranging, after reducing the thickness of each segment, the segments on a same plane or on a substantially smooth curved surface. The refraction surface of the Fresnel lens is generally discontinuously stepped or dentate. In the present disclosure, the curved surfaces (non-smooth surfaces) of the lens are referred to as refraction surfaces.

FIG. 1 shows an ordinary configuration of the Fresnel lens. In FIG. 1, the dash line represents the center of the curved surface. The original curved surface 101 of an ordinary lens 100 may be segmented into a plurality of concentric lens rings 201. After the thickness of each lens ring is reduced, the plurality of lens rings may be arranged on a same plane to form a Fresnel lens 200. Such discontinuous refraction surface evolved from the original curved surface may be referred to as Fresnel refraction surface. Since the refraction of light occurs on the curved surface of the lens and is independent of the thickness of the lens, the Fresnel refraction surface theoretically has optical performance similar to that of corresponding original curved surface, but with greatly reduced thickness. The reduction in thickness can reduce the absorption and attenuation of light energy, which is an important advantage of the Fresnel lens in many applications.

The Fresnel refraction surface generated from one original curved surface may be referred to as one Fresnel unit. A Fresnel unit may be described using five groups of basic parameters: center location, area, focal length, refraction surface shape, and locations and number of segmentation rings.

For simplicity, in the present disclosure, the side on which the Fresnel refraction surfaces are arranged is referred to as "tooth side", the other side which is relatively smooth and flat is referred to as "back side", and the Fresnel lens which has a tooth side on one side and a back side on the other side is referred to as "single-sided Fresnel lens".

The Fresnel lens can not only be used to focus light signals (for example, infrared) to facilitate the detection of the sensor (for example, the passive infrared detector "PIR" shown in FIG. 2), but also be used to focus other electromagnetic wave signals, such as microwaves, radio, X-rays and Gamma rays, etc. Therefore, the "light" herein may refer to electromagnetic wave in any spectrum band of the entire electromagnetic spectrum.

The focus range of single Fresnel unit is limited. In order to increase the signal sensing range, it is also possible to arranging a plurality of Fresnel units on the tooth side. The tooth side on which only one Fresnel unit is arranged may be referred to as "simple Fresnel refraction surface". The single-sided Fresnel lens using such tooth side may be referred to as "single-sided simple Fresnel lens". Correspondingly, the tooth side on which two or more Fresnel units are arranged may be referred to as "composite Fresnel refraction surface", and the single-sided Fresnel lens using such tooth side may be referred to as "single-sided composite Fresnel lens".

The back side of the single-sided composite Fresnel lens is generally a macroscopic surface, such as plane, coaxial surface (including rotation surface, such as sphere, ellipsoid, cylindrical surface, parabolic cylindrical surface, hyperbolic cylindrical surface and high order polynomial surface, etc.), multi-plane surface formed by splicing a plurality of planes, and trapezoidal table surface, etc. FIG. 2 shows the configuration of several single-sided composite Fresnel lens, where the dash lines represents the light paths passing through the centers of the Fresnel units. In FIG. 2(a), the tooth side includes three Fresnel units arranged horizontally, and the back side is a plane (rectangular). In FIG. 2(b), the tooth side includes five Fresnel units, one of which is located at the center and the other four are distributed around, and the back side is a plane (circular). In FIG. 2(c), the back side is a circular cylindrical surface. In FIG. 2(d), the back side is a sphere. In FIG. 2(e), the back side is a multi-plane surface formed by splicing three planes. In FIG. 2(f), the back side is a trapezoidal table surface.

Currently, the existing Fresnel lenses are generally single-sided simple Fresnel lens and single-sided composite Fresnel lens. The performance of these lenses is greatly limited. Therefore, further research and development to Fresnel lens system are needed.

SUMMARY

The present disclosure provides a Fresnel lens system which may include at least two tooth sides arranged on the same optical path. Each tooth side may include at least one Fresnel unit. Each Fresnel unit may be Fresnel refraction surfaces generated from one original curved surface. At least one of the two tooth sides may be composite Fresnel refraction surface or filled Fresnel refraction surface. Or, the two tooth sides may be a same physical interface, and the element on which they are located may have reflective back side.

The Fresnel lens system according to the present disclosure may be implemented in a variety of excellent forms. The two tooth sides included in the Fresnel lens system may be arranged on two separate elements, or may also be combined together back to back to become two sides of a double-sided Fresnel lens.

The Fresnel lens systems according to the present disclosure may have two or more tooth sides. Therefore, the advantage of thin thickness of the Fresnel lens may be fully used, and stronger optical path adjustment function (for example, focus) may be achieved without significant increase in system thickness. The increased focusing ability can reduce the focal length and area of the sensor, which can facilitate the reduction in the size of the device. Furthermore, based on the various preferred solutions proposed by the present disclosure, the configurations and functions of the traditional Fresnel lens can be greatly enriched and expanded.

The specific embodiments according to the present disclosure will be described in details below with reference to the drawings.

DETAILED DESCRIPTION

The Fresnel lens systems according to the present disclosure have at least two tooth sides located on the same optical path. Therefore, they can be referred to as "multi-sided Fresnel lens system". Based on the number of the tooth sides located on the same optical path, they can specifically be referred to as "double-sided Fresnel lens system", "three-sided Fresnel lens system" or the like. In the lens system according to the present disclosure, there may be one or more elements. Based on the number of the tooth sides arranged on a single element, they can similarly be referred to as "single-sided Fresnel lens", "double-sided Fresnel lens" or the like.

It should be noted that there is difference between "double-sided Fresnel lens system" and "double-sided Fresnel lens". The double-sided Fresnel lens refers to a lens whose both sides are tooth sides, while the double-sided Fresnel lens system may be formed by one double-sided Fresnel lens or two single-sided Fresnel lens systems.

Figure 3:
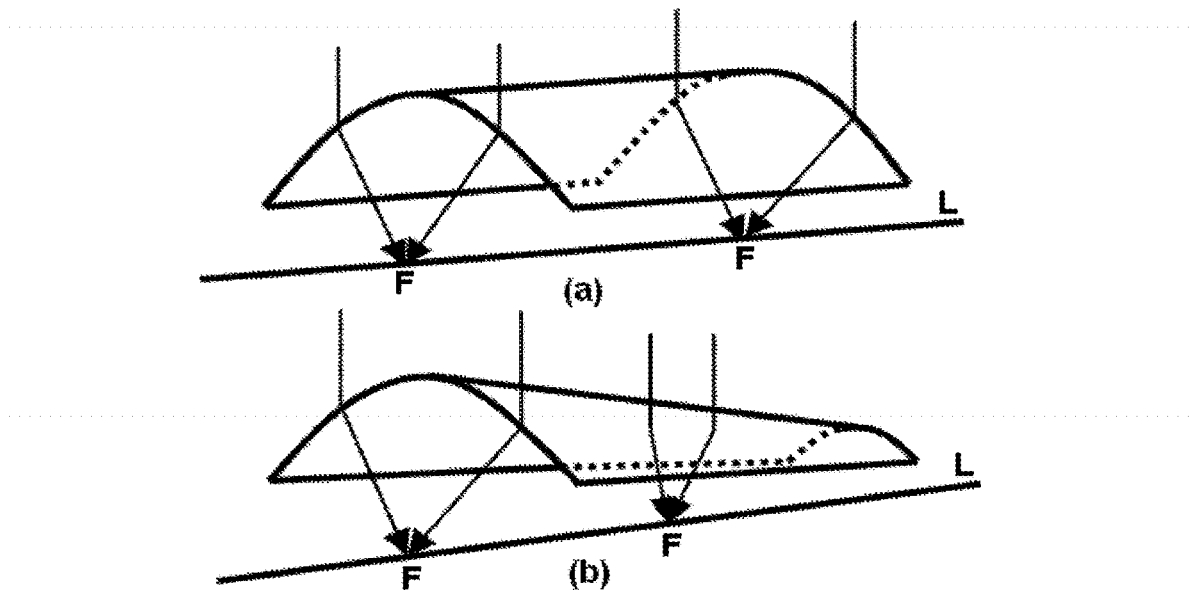
FIG. 3 schematically shows two coaxial surfaces used for generating the Fresnel refraction surfaces according to the present disclosure.

Each tooth side in the system may include at least one Fresnel unit. Each Fresnel unit may be the Fresnel refraction surfaces generated from one original curved surface. Traditional original curved surface used for generating the Fresnel refraction surfaces is generally symmetrical curved surface around the optical axis, for example, rotation surface such as sphere, rotation paraboloid or the like. The focus of the traditional original curved surface is located at one point, and therefore the traditional original curved surface may be referred to as "co-point surface". In the present disclosure, the original curved surface may be any coaxial surface, and may be set according to the requirements of the application. The coaxial surface herein may refer to the curved surface whose focuses are located on a same straight line (not necessarily on a same point). Such straight line may be referred to as "coaxial line". The traditional co-point surface may be considered as a special case where the coaxial line of the coaxial surface is degenerated into one point. Using the original curved surface which is coaxial but not co-point, the sensing device arranged at the focus position can be extended from a small area (corresponding to the focus) to a elongated shape (corresponding to the coaxial line formed by the focuses), thereby increasing the signal collection capability and facilitating to solve the issue of local overheating without significant increase in cost. Typical coaxial surface may include rotation curved surface (including secondary or higher order rotation curved surface), cylindrical surface or tapered surface, etc. The cylindrical surface may also be referred to as equal-section coaxial surface. The shape and size of the cross section obtained by cutting such surface at any point in the direction perpendicular to the coaxial line are the same. The circular cylindrical surface is a special case of the cylindrical surface. The cross sections of the tapered surface along the coaxial line have similar shape, but different size. The circular tapered surface is a special case of the tapered surface. FIG. 3 shows the two coaxial surfaces above, where, FIG. 3(a) shows the equal-section coaxial surface, FIG. 3(b) shows the tapered coaxial surface, and their focuses F are located on respective coaxial line L, respectively.

The single tooth side may be the composite Fresnel refraction surface including two or more Fresnel units. Generally, the basic parameters (for example, area, focal length, the shape of corresponding original curved surface, number of concentric rings, etc.) of the Fresnel units on the composite Fresnel refraction surface may be set flexibly, and may be all the same, partially the same or all different. In an embodiment, each Fresnel unit on the composite Fresnel refraction surface may have its own optical center, but the focuses may be located at the same point, on one straight line or within a limited area. This may be implemented by spatially arranging each of the Fresnel units forming the composite Fresnel refraction surface. It can be considered that these Fresnel units are arranged on a macroscopic surface, such as plane, quadratic surface (including sphere, ellipsoid, circular cylindrical surface, parabolic cylindrical surface and hyperbolic cylindrical surface), high order polynomial surface (an ordinary way for implementing an aspherical surface), multi-plane surface formed by splicing a plurality of planes, and trapezoidal table surface, etc.

The single tooth side may also be filled Fresnel refraction surface. The filled Fresnel refraction surface herein may be formed by filling transparent materials on a Fresnel refraction surface (which may be referred to as "mother surface") formed by solid material. The Fresnel refraction surface formed by the filled transparent materials may be referred to as "child surface". The shape of the child surface may be completely complementary to the mother surface. The refractive index of the material used to form the child surface may be different from that of the material used to form the mother surface. Of course, the refractive index of the material used to form the child surface may also be different from that of surroundings (for example, atmosphere). The filling materials used to form the child surface may be selected from solid, liquid or gas material. The solid filling material may be, for example, acrylic, plastic or resin. The liquid filling material may be, for example, water. The gas filling material may be, for example, inert gas.

Figure 4:
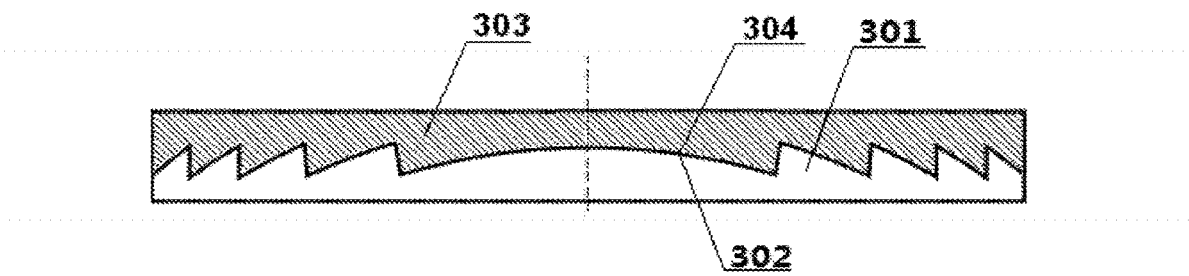
FIG. 4 schematically shows the filled Fresnel refraction surface according to the present disclosure.

Referring to FIG. 4, a Fresnel unit with a convex surface 302 may be formed by material 301, and a Fresnel unit with a concave surface 304 may be formed by material 303. The two Fresnel units may be completely complementary to each other in shape, and form a tooth side by a close fit face to face. The Fresnel lens formed by the material 301 may be referred to as "mother lens". The mother lens may be enclosed into a cavity which has a space at the upper part and is transparent. And then, the transparent material 303 may be filled into the cavity, thereby obtaining another Fresnel lens which is completely opposite in concave and convex nature and may be referred to as "child lens".

The configuration of the filled Fresnel refraction surface enables that different focus ability can be obtained by adjusting the refractive indexes of the materials at both sides of the tooth side, and therefore more flexibility may be provided for the optical design of the Fresnel lens system and the cost may be reduced. In an embodiment, the material 301 and the material 303 are different solid material, by which the Fresnel units are formed respectively and closely fitted together. The solid filled Fresnel lens and two traditional Fresnel lenses closely fitted together face to face are the same in configuration, but different in processing process, processing difficulty and thereby requirements to the materials (of mother lens and child lens). In another preferred embodiment, the material 301 may be solid and the material 303 may be liquid or gas. The Fresnel unit may be formed with the solid material 301 first, then the liquid or gas material 303 may be filled on the tooth side and packaged, thereby forming the filled Fresnel refraction surface. Using this method, the processing of one Fresnel unit may be omitted. The used liquid filling material may be, for example, water. The used gas may be inert gas, such as nitrogen. Using liquid to form the filled Fresnel refraction surface has many advantages. On one hand, the heating or cooling of the lens may be easily achieved through the liquid; on the other hand, the liquid is able to be seamlessly combined with the Fresnel unit formed by the solid material to easily overcome the shortcomings of easily producing glare of the Fresnel lens, such that the Fresnel lens system can be used for high-resolution imaging system, such as the lens of digital camera and mobile phone. The glare of the traditional Fresnel lens is generally caused by the discontinuity of the tooth side of the Fresnel lens. Such discontinuity can be compensated by complementary liquid or gas lens, thereby greatly reducing the glare. Using such filled Fresnel lens formed by filling liquid or gas in the first level lens of the wide-angle lens can greatly reduce the size of the lens.

Figure 5:
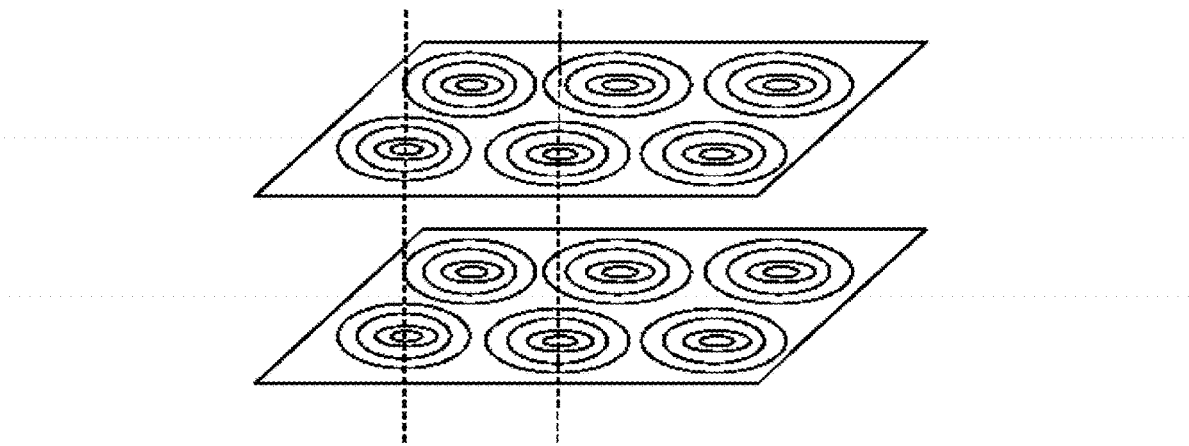
FIG. 5 schematically shows the concentric arrangement of the Fresnel units on the two tooth sides according to the present disclosure.
Figure 6:
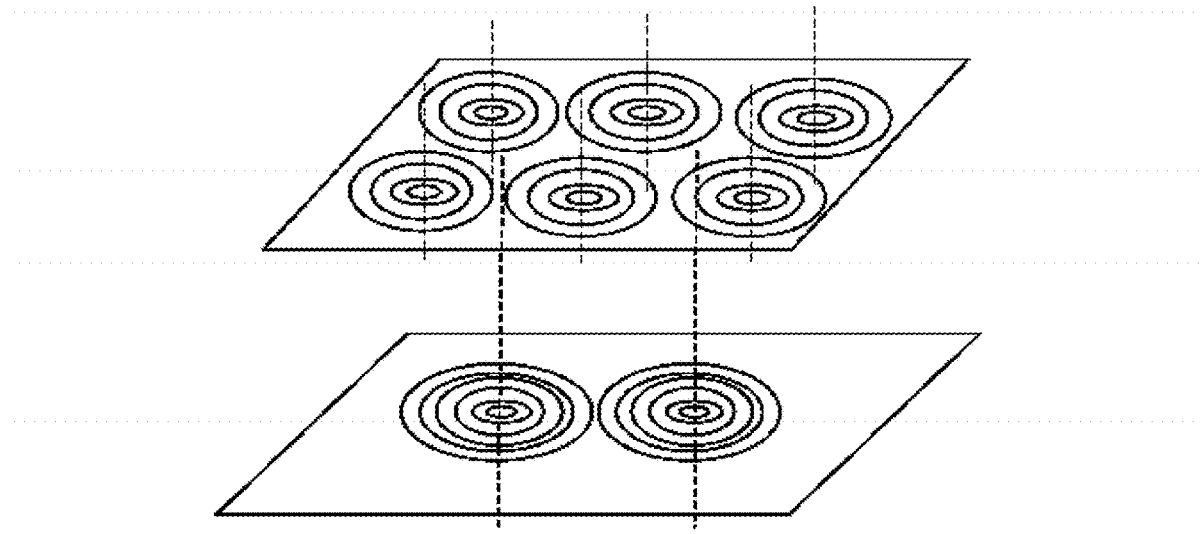
FIG. 6 schematically shows the staggered arrangement of the Fresnel units on the two tooth sides according to the present disclosure.

The relative position of the Fresnel units on the two tooth sides may be arranged in two preferred arrangement. One arrangement is shown in FIG. 5, where the Fresnel units on the two tooth sides are the same in number and are arranged concentrically. The concentric arrangement may refer to that the optical axes of each two Fresnel units on the two tooth sides coincide with each other. The other basic parameters (for example, the focal length, the shape of corresponding original curved surface and the number of concentric rings, etc.) of the Fresnel units may or may not be the same, and may be set according to the requirements of the optical design. In FIG. 5, two optical axes are schematically shown in dash lines, and each optical axis corresponds to one Fresnel unit on one tooth side and one Fresnel unit on the other tooth side. The advantage of the concentric arrangement is that the signal near the center of the Fresnel unit can be enhanced. Another arrangement is shown in FIG. 6, where the Fresnel units on the two tooth sides are different in number and arranged in a staggered manner. The staggered arrangement may preferably have the same stagger distances. The staggered arrangement may refer to that the optical axes of the Fresnel units on the two tooth side are staggered with each other. Having the same stagger distances may refer to that the distances between the optical axis of a certain Fresnel unit on one tooth side and the optical axes of several Fresnel units which surround said optical axis on the other tooth side are the same. In FIG. 6, the optical axes are represented by dash lines. The optical axis of one Fresnel unit on the tooth side below is located at the center of the axes of four Fresnel units on the tooth side above. The advantage of the staggered and equidistant arrangement is that the signal can be equalized such that dead space and blind spot in the sensing range can be reduced.

Figure 1:
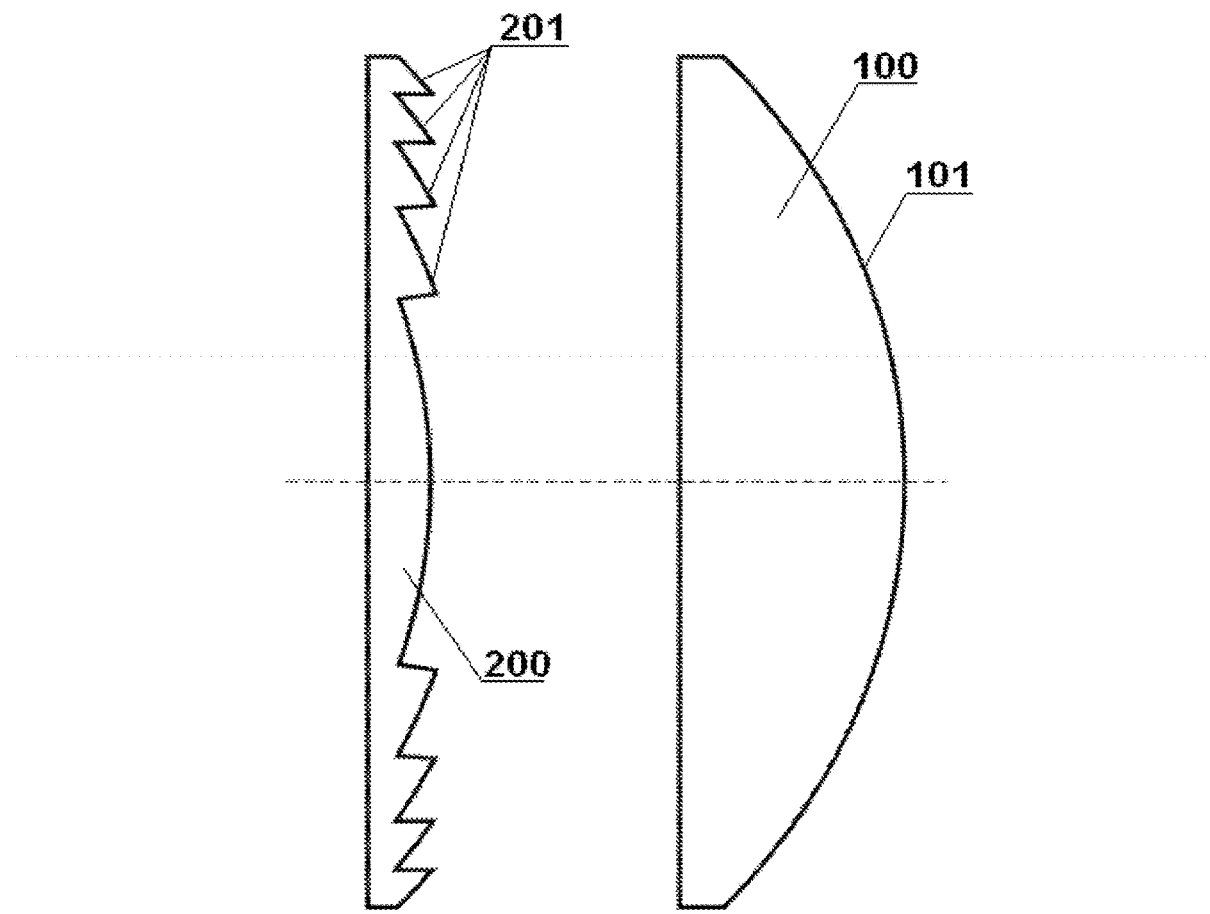
FIG. 1 schematically shows the configuration of an existing Fresnel lens.
Figure 2:
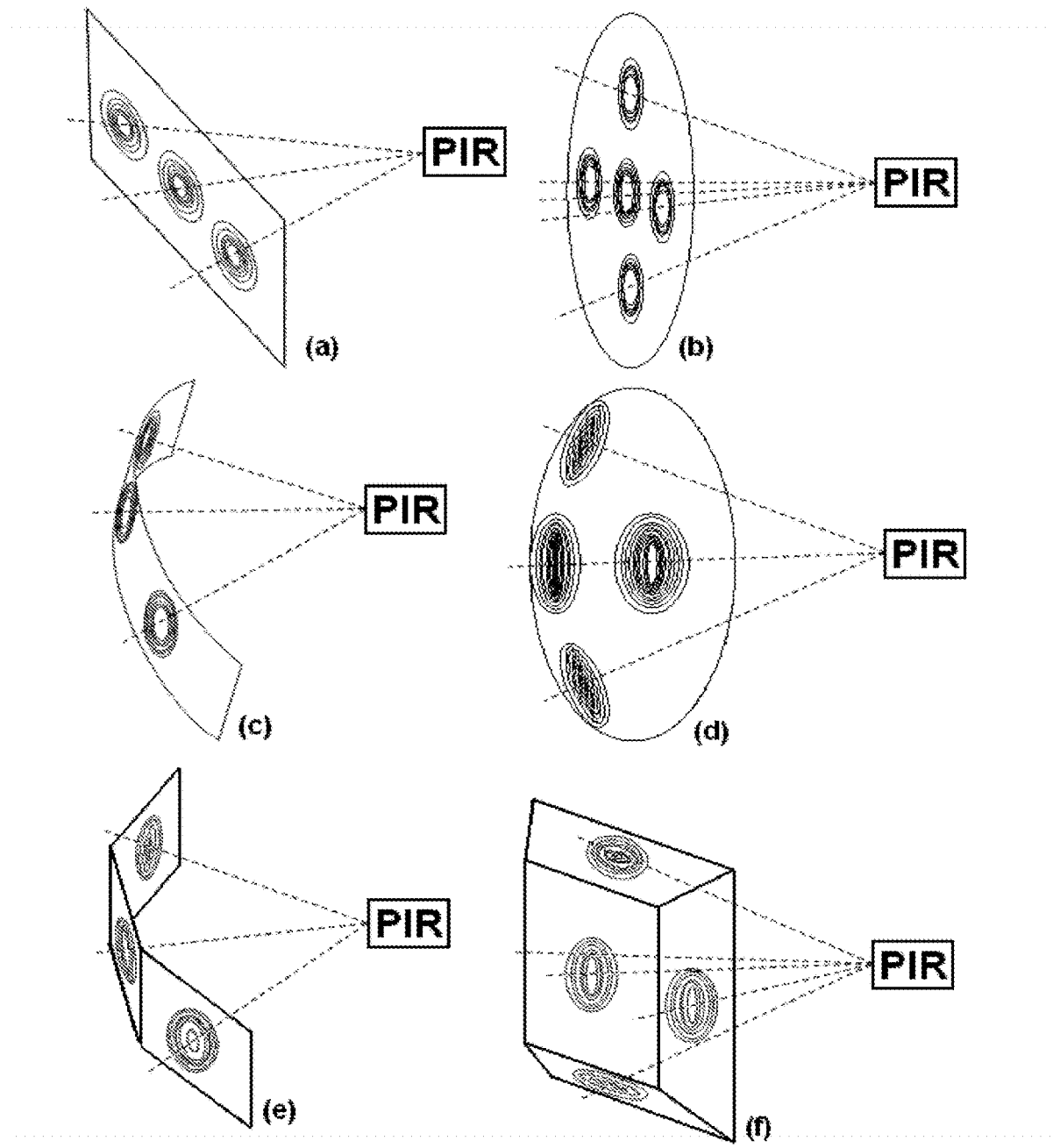
FIG. 2 schematically shows the configuration of several existing single-sided composite Fresnel lenses.
Figure 7:
FIG. 7 schematically shows the back-to-back combination configuration of the two tooth sides according to the present disclosure.

Generally, two or more tooth sides may be combined flexibly to form one or more elements. For example, the composite Fresnel refraction surface may be used in a single-sided element to form the single-sided composite Fresnel lens, such as those shown in FIG. 2. The single-sided composite Fresnel lens may also be considered as being formed by arranging the back sides of two or more single-sided simple Fresnel lenses on one macroscopic surface. In an embodiment, two tooth sides may be located respectively on two separate elements to form a system formed by two single-sided Fresnel lenses. The orientation between the two elements may be tooth side to tooth side, tooth side to back side, or back side to back side. In another embodiment, referring to FIG. 7, the two tooth sides may be arranged on the same element in a back-to-back manner. The part of the two tooth sides may be formed with the same or different materials. Therefore, the dividing line in FIG. 7 is represented with dash line. In the case that two Fresnel lenses in back-to-back form are formed with the same materials, a double-sided Fresnel lens is formed, and can be made by one-piece molding, for example by die using acrylic, resin or other plastic materials. The concave and convex nature of the two tooth sides may be the same or be different. In another embodiment, the system may have three tooth sides, where one is used for a single-sided element and the other two are formed as a double-sided Fresnel lens in back-to-back form. In other embodiments, the configuration described above may also be combined and extended based on needs.

Figure 8:
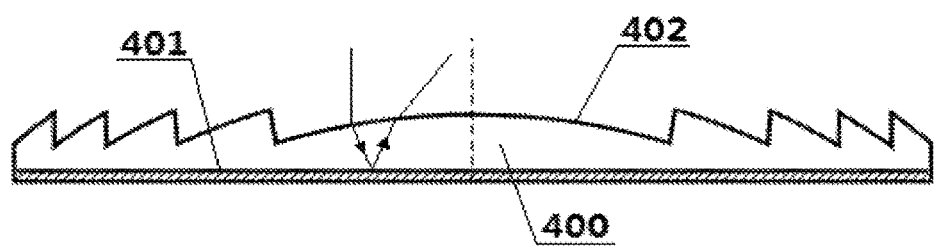
FIG. 8 schematically shows the configuration of the reflective Fresnel lens according to the present disclosure.

It should be recognized that the two tooth sides of the system may be implemented by the same physical interface through arranging reflective surface. Referring to FIG. 8, the element 400 may be provided with a reflective back side 401 (the inner surface is mirror). The back side 401 may be formed by, for example, plating a reflective film or bonding patches with reflective capability on the smooth surface of the single-sided Fresnel lens or other ways. Because of the reflection, the incident light path may pass through the physical refraction interface 402 twice. Therefore, such physical interface may equivalent to two tooth sides. The element 400 may also be referred to as reflective double-sided Fresnel lens, and the concave and convex nature of the two tooth sides may be the same. By arranging the reflective back side, the number of the tooth sides in the light path may be simply increased, the production cost and installation cost may be reduced, and the use forms of the Fresnel lens may be greatly increased.

The application of the Fresnel lens system according to the present disclosure will be illustrated through specific embodiments.

Embodiment 1

Figure 9:
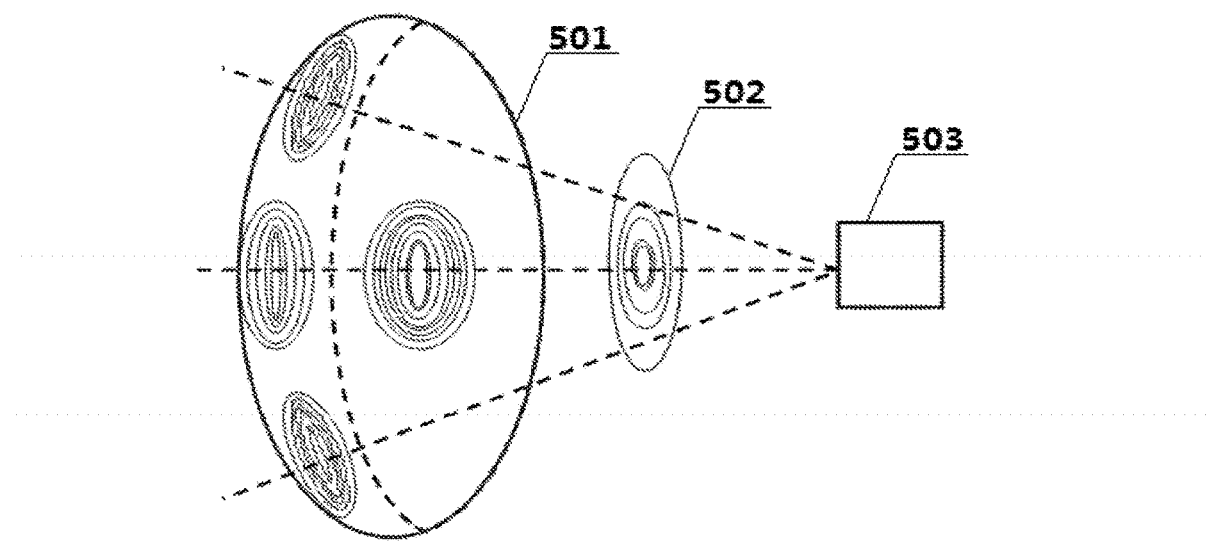
FIG. 9 schematically shows the configuration of the Fresnel lens system of embodiment 1.

FIG. 9 shows an embodiment of the Fresnel lens system according to the present disclosure, which may include two tooth sides. One tooth side 501 may be a composite Fresnel refraction surface, and the other tooth side 502 may include only one Fresnel unit. The dash lines in the figure may represent the optical axes of the Fresnel units. The two tooth sides may be arranged respectively on two separate single-sided elements to form one single-sided composite Fresnel lens and one single-sided simple Fresnel lens. The two single-sided lenses may be arranged successively on the light path in a tooth side to back side manner and used to collectively focus the signals to the sensor 503. The composite Fresnel lens may be considered as the objective lens of the focusing system, while the simple Fresnel lens may be considered as the eyepiece. The lens system of the present embodiment may be used for detecting long distance signals, and may also be used for achieving graded condensing.

As a preferred embodiment, one or two of the two lenses may be driven by motor. For example, the motor may drive the lens acting as the eyepiece to perform auto focus, or, the motor may further drive the lens acting as the objective lens to perform zooming.

Embodiment 2

Figure 10:
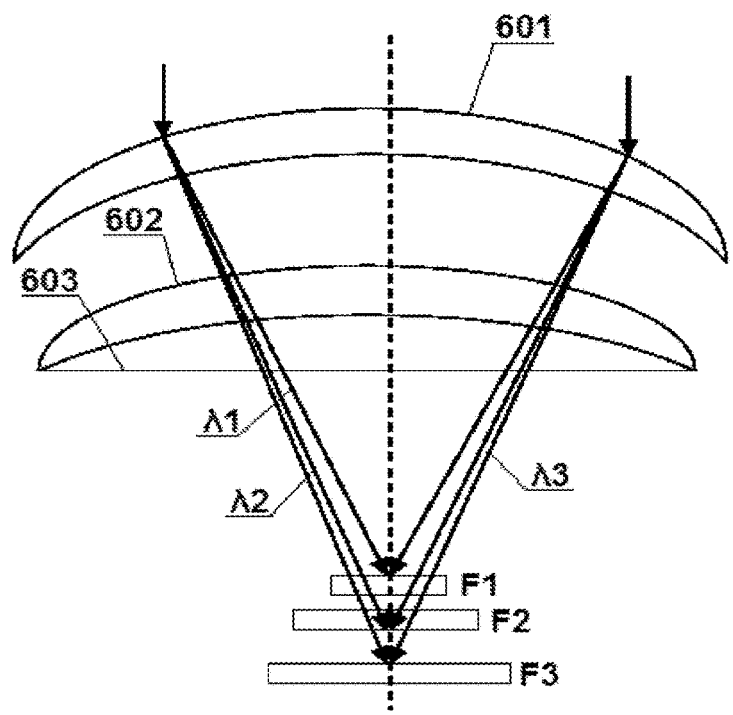
FIG. 10 schematically shows the configuration of the Fresnel lens system of embodiment 2.

FIG. 10 shows another embodiment of the Fresnel lens according to the present disclosure, which may include three tooth sides. The first tooth side 601 may be a composite Fresnel refraction surface, and arranged on a single-sided element to form a single-sided composite Fresnel lens to perform the first focus on the light signals. The second tooth side and the third tooth side may be composite Fresnel refraction surfaces or may also include one Fresnel unit. For example, the second tooth side and the third tooth side may have the positional relationship as shown in FIG. 5 or FIG. 6. These two tooth sides may be arranged on the same element, or may also be arranged respectively on two single-sided elements. In the present embodiment, the second tooth side 602 and the third tooth side 603 may form, in a back-to-back manner, a double-sided Fresnel lens, and be used to perform the second focus on the light signals.

In the present embodiment, the focusing system formed by the two lenses above may focus the light onto three different focal planes based on the central wavelength of different spectral bands, where the focal planes F1, F2 and F3 correspond to the central wavelength of three spectral bands λ1, λ2 and λ3. Generally, the relation between the focal length of the lens and the wavelength is monotonically incremental. In other words, the longer the central wavelength of the light, the farther the focal plane on which the light focus. In traditional lens design, this relationship generally needs to be overcome. However, in the present embodiment, the principle may be conformed and used to generate a plurality of focal planes. For a person skilled in the art, the light with different wavelength may be better focused on focal planes with different focal length by optically designing the tooth sides and applying appropriate coating, etc. Based on actual needs, the number of the focal planes may be 1 to 4. In the case that there is one focal plane, the affects of the wavelength to the focal length needs to be eliminated as much as possible, as the design of the traditional lens. While in the case that a plurality of focal planes are used, not only the optical design is easier, but also the light in different spectral bands can be better specially used and processed in different focal planes.

Figure 11:
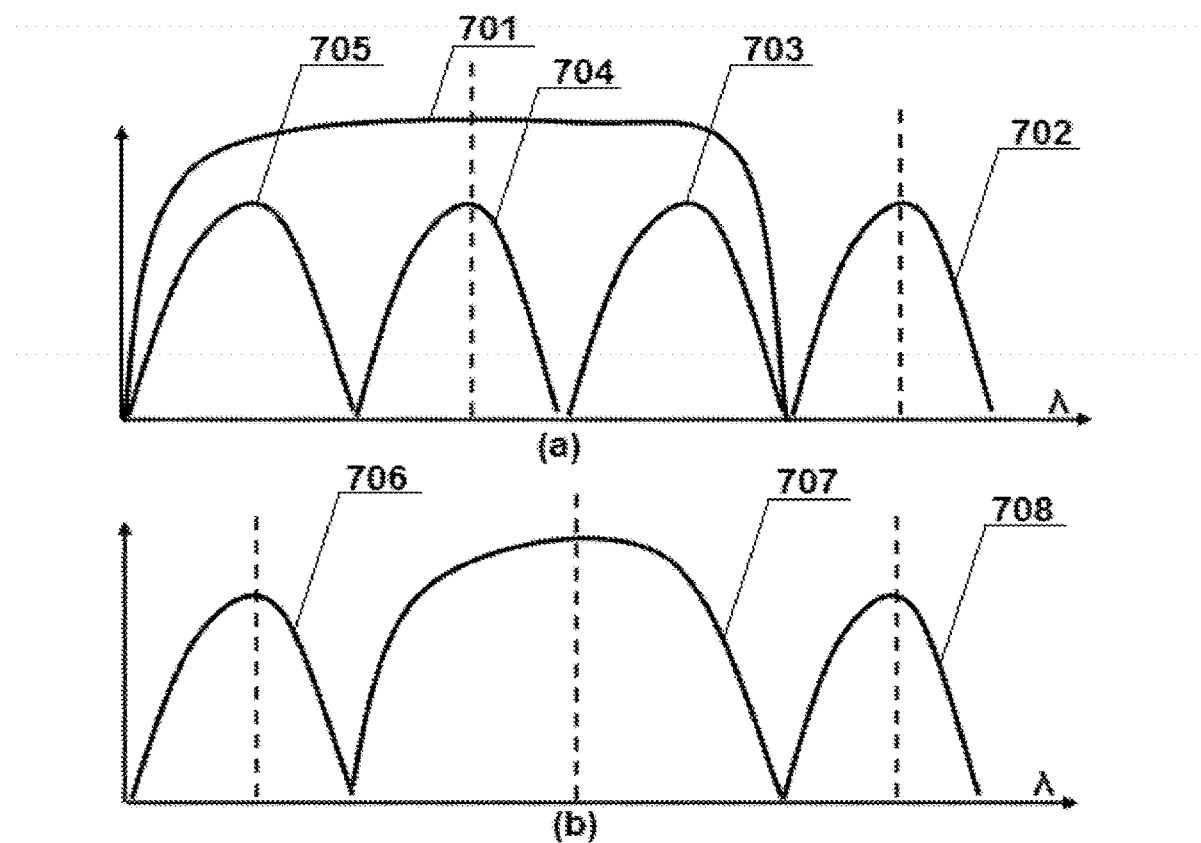
FIG. 11 schematically shows two ways for dividing the spectral segments according to the present disclosure.

In the present embodiment, the sensors for corresponding spectral bands may be arranged on the focal planes to obtain the best response to the light with the wavelengths belonging to the spectral bands. Arranging different sensors on different focal planes may also achieve the maximize use of the incident light energy. Furthermore, the light in different spectral bands may be focused on different focal planes, which can facilitate multi-layer sensing. In the present embodiment, the three focal planes may correspond to three spectral bands divided. In other embodiments, the spectral range of interest may be divided into different sections according to the wavelength λ. The specific division may refer to the existing general rules, or may also be adjusted according to the requirements of the actual applications. FIG. 11 shows two common divisions. In one division, the spectrum may be divided into two sections: visible spectral band 701 and (near) infrared spectral band 702, referring to FIG. 11(*a*), where the dash lines represent the location of the central wavelength of the two sections. The visible spectral band 701 may include three spectral bands: red 703, green 704 and blue 705. In another division, the spectrum may be divided into three sections: ultraviolet spectral band 706, visible spectral band 707 and infrared spectral band 708, referring to FIG. 11(*b*), where the locations of the central wavelength of the three sections are similarly represented by dash lines.

The principles of the embodiment may also be used for designing the antenna in the field of modern wireless communication such that the antenna can simultaneously receive different frequency bands of signals, because the Fresnel lens system according to the present disclosure is applicable to any spectrum of electromagnetic waves.

The principles and embodiments of the present disclosure have been described with reference to specific examples. It should be understood that the embodiments above are merely used to facilitate the understanding to the present disclosure, but should not be construed as limiting the present disclosure. For a person ordinarily skilled in the art, modifications to the specific embodiments described above may be made according to the concepts of the present disclosure.

The invention claimed is:

1. A Fresnel lens system, comprising at least two tooth sides located on a same optical path,
   Wherein the two tooth sides are both composite Fresnel refraction surface on which at least two Fresnel units are arranged, and the Fresnel units on the two composite Fresnel refraction surfaces are different in number and arranged in a staggered manner, wherein each Fresnel unit is a Fresnel refraction surface generated from one original curved surface.

2. The system of claim 1, wherein, the original curved surface is a coaxial surface whose focuses are located on a same straight line, and the coaxial surface comprises rotation quadratic surface, rotation higher order polynomial surface, cylindrical surface and tapered surface.

3. The system of claim 1, wherein, the Fresnel units of each tooth side have a common back side, and the back side is formed as a macroscopic surface.

4. The system of claim 3, wherein the macroscopic surface is selected from plane, coaxial surface, multi-plane surface formed by splicing a plurality of planes and trapezoidal table surface.

5. The system of claim 1, wherein Fresnel lens units on a same tooth side focus light in a same spectral band to a same point, or a straight line, or a limited area.

6. The system of claim 1, wherein, the system focuses lights to corresponding focal planes based on central wavelengths of different spectral bands so as to arrange sensors for corresponding spectral bands on the focal planes, and number of the focal planes is 1 to 4.

7. The system of claim 6, wherein the longer the focal length of the focal plane, the longer the corresponding central wavelength.

8. The system of claim 1, wherein, the two tooth sides are arranged on two separate elements, respectively, and one of the two separate elements is driven by a motor to perform an auto focus and/or the other of the two separate elements is driven by a motor to perform zooming.

9. The system of claim 1, wherein the staggered arrangement has equal stagger distances.

\* \* \* \* \*